United States Patent [19]
Govoni et al.

[11] Patent Number: 5,610,244
[45] Date of Patent: Mar. 11, 1997

[54] PROCESS FOR THE GAS PHASE POLYMERIZATION OF ALPHA-OLEFINS

[75] Inventors: Gabriele Govoni, Renazzo; Roberto Rinaldi; Giuseppe Penzo, both of Mantova, all of Italy

[73] Assignees: Montell North America Inc., Wilmington, Del.; Montell Technology Company BV, Netherlands

[21] Appl. No.: 537,708

[22] PCT Filed: Feb. 15, 1995

[86] PCT No.: PCT/EP95/00544

§ 371 Date: Dec. 8, 1995

§ 102(e) Date: Dec. 8, 1995

[87] PCT Pub. No.: WO95/22565

PCT Pub. Date: Aug. 24, 1995

[30] Foreign Application Priority Data

Feb. 21, 1994 [IT] Italy .................................. MI94A0305

[51] Int. Cl.$^6$ ........................................... C08F 2/34
[52] U.S. Cl. ............................ 526/65; 526/78; 526/901
[58] Field of Search ................................. 526/65, 78, 901

[56] References Cited

U.S. PATENT DOCUMENTS 3,709,853  4/1971  Karapinka ............................ 526/130

Primary Examiner—Thomas R. Weber

[57] ABSTRACT

A process for polymerizing olefins using a fluidized bed, in which the monomer entry point is located at a point above the bed height. A pre-polymerization step can be conducted using a Z/N catalyst along with an alkane diluent, and resultant liquid phase is introduced into the fluidized bed above the bed height. The process may use several reactors in series arrangement.

7 Claims, 2 Drawing Sheets

PROCESS FOR THE GAS PHASE POLYMERIZATION OF ALPHA-OLEFINS

The present invention relates to a continuous process for the gas phase polymerization of olefins of formula $CH_2=CHR$, in which R is hydrogen or an alkyl, cycloalkyl or aryl radical having 1 to 12 carbon atoms, carried out in one or more reactors having a fluidised bed, in the presence of a high activity catalyst preferably comprising a titanium compound having at least one Ti-halogen bond supported on magnesium dichloride in active form.

Processes for the continuous polymerization of one or more olefins, such as ethylene or propylene, carried out in gas phase in fluidised bed reactors are well known in the art. The polymerization is generally carried out in the presence of a catalyst based on a transition metal compound belonging to the groups IV, V or VI of the periodic table, in particular in the presence of a Ziegler-Natta type catalyst or a chromium oxide based catalyst.

The reactor generally consists of a reaction zone, in which the polymer particles are maintained in a fluidised state by passing a gaseous reaction mixture containing olefin(s) and optionally an inert gas through a bed of polymer particles, and a gas velocity reduction zone, where most of the polymer particles entrained in the fluidisation gas fall in the underlying reaction zone. The catalyst is introduced in the reactor continuously and the polymer constituting the fluidised bed is also removed continuously.

A gas distribution grid placed in the lower part of the reactor under the reaction zone is the means through which the fluidisation gas is sent through the polymer bed and is used to support the bed itself when the polymerization is discontinued.

The gaseous mixture, comprising monomers, comonomers, inert gas and molecular weight regulators, leaving the top of the reactor is sent to the reactor at a point below the gas distribution grid through a recycling line. Devices for the compression and cooling of the gases are generally arranged on said recycling line.

Make-up monomers are usually fed in the gas recycling line in such a way to have a certain homogeneity of the gaseous mixture inside the reactor.

It is in fact known that small variations in the operating conditions during the polymerization, resulting for example from small variations in the quality of the catalyst or of the olefin used in the reaction or from the dishomogeneity in the composition and in the flow rate of the gaseous mixture, can bring about changes in behaviour and catalytic activity of the polymer particles and produce a particularly adverse effect on the gas phase polymerization process. These small variations may cause an unexpected rising of the amount of heat produced in the reaction, which can not be removed in a sufficiently quick and efficient manner by the gaseous reaction mixture passing through the bed.

As a result, hot spots can be generated in the bed with the consequent formation of aggregates of melted polymer.

When these hot spots are formed in the bed, it is in general too late to prevent the formation of aggregates. Nevertheless if the reaction conditions are promptly corrected, especially by reducing the temperature or the pressure of polymerization, or by reducing the velocity at which the catalyst is fed into the reactor in order to avoid the negative effect of undesirable superactivity, the quantity and size of the aggregates could be reduced to a certain extent.

In the industrial practice these operations are not generally carried out, in that they bring about a reduction in the polymer production and a deterioration of the quality of the obtained polymer.

In order to avoid these drawbacks, general polymerization conditions are usually selected with a safety margin such to not allow local rising of the temperature and the consequent formation of aggregates. For example catalysts are used having a reduced activity.

The use of these conditions inevitably results either in a substantial reduction in the production or in a deterioration of the quality of the polymer produced.

U.S. Pat. No. 3,709,853 describes a process for the polymerization of ethylene using chromium catalysts which are directly fed into the polymerization bed. The make-up feed stream is used, partially or totally, to carry the catalyst into the reactor; preferably only a part of the feeding monomers is used as the carrier for the catalyst since the injection of large amounts of gas into the bed will cause the formation of preferential channels and a consequent loss in the fluidisation. It should be kept in mind that the introduction of the catalyst and the gas directly into the bed, even if in small quantities, is in any case an inconvenience for the fluidisation of the bed.

For this reason feeding fresh monomers into the recycle line is generally preferred, so that the only gas stream that enters into the bed is the fluidisation gas.

U.S. Pat. No. 4,855,370 describes a gas phase process for the polymerization of ethylene in which the monomers are fed into the recycle line together with a suitable amount of $H_2O$ in such a way to neutralise the electrostatic charges which are formed inside the reactor and which cause the adhesion of the catalyst and polymer particles to the reactor walls. The feeding point of the ethylene is close to the reactor inlet point, downstream of the heat exchanger placed on the recycle line. In these conditions there is an insufficient gas homogeneity and the local difference of the reactive monomer concentrations in the gaseous mixtures can give rise to the previously described problems. In addition, when the gaseous mixture comprises heavy comonomers, at least a portion of these comonomers is introduced in the reactor in liquid form, with the consequent problems of dishomogeneity and agglomeration in the lower part of the bed.

U.S. Pat. No. 5,034,479 describes a gas phase process for the polymerization of ethylene and mixtures thereof with other α-olefins in which the monomers, an inert gas and hydrogen are fed in the recycle line at a point upstream of the heat exchanger in order to neutralise the negative effects of the impurities present in the gaseous feed mixture.

One of the problems that are found when the make-up monomers are fed in the gas recycle line derives from the presence of solid particles, entrained in the gas exiting the reactor, in the gaseous mixture which is recycled. The composition of the recycling gaseous mixture is generally similar to the composition of the gas mixture present in the reactor and also comprises, besides the polymerisable monomers, inert gas and molecular weight regulators. The reactivity of the entrained solids in this environment is relatively low. Nevertheless, close to the feeding point of the monomers, the solid particles are locally in a highly reactive environment in that they are practically pelted by a stream of monomers; the polymerization then continues also in the recycle line with the consequential problems of fouling of the pipe and of the devices placed along the line itself. These problems are particularly highlighted when the feeding is carried out in a point comprised between the compressor and the heat exchanger, which is generally the point where there is the highest temperature and therefore the reactivity is extreme. The problems are worsened when the monomers are fed in the liquid form.

Direct feeding of make-up monomers in the reactor is usually carried out in gas phase processes in which the polymer bed is mechanically stirred, in that the problems connected with the non-uniform distribution of the gas inside the bed can be avoided by means of this system for stirring.

Now it has been found that it is possible to solve the problems of reactor fouling and fouling of the devices for transferring and discharging the polymer and the gas, by feeding the make-up monomers directly in the fluidised bed reactor at one or more points above said bed. Additionally it has been surprisingly observed that, even though the monomers are fed in the upper part of the reactor generally counter current to the fluidisation gas, no interruptions or inconveniences to the maintenance of the homogenous fluidisation of the polymer bed result; in addition the problems of fouling and clogging of pipes and devices, which take place when the monomer feeding is carried out in the recycle line, are overcome with consequent improvements of the operation conditions of the plant and of the quality of the polymer. The feeding of the monomer in the upper part of the reactor additionally allows an improved homogeneity of the monomers in the fluidising gas stream; at the same time the possible post-polymerization of fresh monomers with the particles of catalyst and/or polymer containing catalyst, entrained in the gas velocity reduction zone, does not have negative consequences on the polymer properties. For point or points in the upper part of the fluidised bed, it is meant any point or points situated in the velocity reduction zone of the gas stream, in which zone the polymer particles entrained in the gas stream have the possibility of falling back in the fluidised bed. For make-up monomers, the monomers are intended which are fed into the reactor in order to compensate for the monomers used during the polymerization reaction.

Therefore, the object of the present invention is a continuous process for the gas phase polymerization of one or more olefins $CH_2$=CHR, where R is hydrogen or an alkyl, cycloalkyl or aryl radical having 1 to 12 carbon atoms, using a catalyst comprising the reaction product of the following components: (A) a titanium or vanadium compound having at least one Ti-halogen or V-halogen bond respectively, a magnesium halide and optionally an electron donor; (B) an alkyl-aluminium compound; (C) optionally, an electron donor compound. Said polymerization is carried out in one or more fluidised bed reactors comprising a polymerization zone, including the fluidised bed, and a gas velocity reduction zone situated above the bed, said fluidised bed reactor being joined to a recycle line, comprising compression and cooling devices, by means of which the gas exiting at the top of the reactor is compressed, cooled and again sent to the reactor at a point below the reaction zone. The process of the invention is characterised by the fact that the make-up monomer or monomers are directly sent to said fluidised bed reactor in one or more points above the fluidised bed.

Preferably the polymerization process is carried out in the presence of an inert gas selected from the alkanes having 3 to 5 carbon atoms, among which propane is particularly preferred. Other inert gases, such as for example nitrogen, methane and ethane, can be used.

The preferred catalyst comprises the reaction product of a titanium compound, containing at least one Ti-halogen bond, supported on activated magnesium halide with a trialkyl aluminium compound.

In order to improve the production efficiency the catalyst components, before being introduced in the reactor in the gas phase, may be subjected to the following treatments:

(a) precontacting the catalyst components in the absence of polymerizable olefins or in the presence of said olefins in amounts smaller than 5 grams per gram of solid catalyst component (A);

(b) prepolymerization of one or more olefins $CH_2$=CHR, in amounts ranging from 10 g per g of solid component (A) up to 10% of the final catalyst yield.

In this case the make-up monomer or monomers may be fed into the reactor together with the stream exiting from the prepolymerization reactor; said stream is also sent to the polymerization reactor at a point placed above the fluidised bed.

Moreover it has been seen that by operating as previously described, it is possible to feed the reactor with monomers in condensed form, without the known inconveniences of agglomeration of the bed and loss of fluidisation. Besides the previously described advantages, the liquid monomer feed contributes, at least partially, to the polymerization heat removal with a consequent improvement in the operating conditions.

The gas phase polymerization is generally carried out at a temperature lower than the polymer sintering temperature. Generally the temperature is between 50° C. and 120° C. and preferably between 70° C. and 100° C.

The total pressure is generally between 1.5 and 3 MPa.

In the gas phase reactor the fluidisation is obtained with a high speed flow of the recycle gas towards and through the bed, typically of the order of about 50 times the flow speed of the feed gas being introduced.

The make-up monomer or monomers are fed to the bed in an amount approximately equal to the amount of polymer produced.

In order to ensure complete fluidisation, the recycle gas is resent to the reactor at a point below the bed. A gas distribution plate, positioned above the inlet point of the recycle gas, ensures an appropriate distribution of the gas and additionally acts as a support of the resin bed when the gas flow is stopped.

Hydrogen may be used as a chain transfer agent in order to regulate the molecular weight of the polymer.

BRIEF DESCRIPTION OF THE DRAWINGS

A typical simplified scheme of the process is shown in enclosed FIG. 1. The reference number (1) indicates the line through which the catalyst, optionally subjected to the previously described precontacting and prepolymerization treatments, is fed to the gas phase reactor (4) at a point above the fluidised bed. The fresh make-up monomers are sent to the gas phase reactor (4), in one or more points above the fluidised bed, by means of a line (2). Part of said monomers may be conveniently sent, by means of line (3), to the catalyst feed line (1) and then into the gas phase reactor (4). The system also comprises a gas recycle line (5) on which are placed a heat exchanger (6) and a compressor (7) which provide for the cooling and compression of the recycle gas. The polymer is discharged along line (8) and sent to the subsequent process step.

Another embodiment of the process, comprising a precontacting step of the catalyst components, a prepolymerization step and two gas phase polymerization steps, is indicated in enclosed FIG. 2. The reference number (1) indicates the apparatus in which the components of the catalyst system are precontacted. The loop reactor (2) is the prepolymerizer. The gas phase reactors are indicated by numbers (4) and (6), the separators of the solid from the fluids with the numbers (3), (5) and (7). The catalyst components are fed into the precontacting reactor (1), as indicated by the arrow (8). The activated catalyst is fed to the reactor loop (2) as indicated by the arrow (9). The prepolymer-catalyst system produced is fed to the gas phase reactor (4) or, in the case that it is desirable to separate the solids from the liquids, to separator (3) and from there to the gas phase reactor (4). The polymer exiting reactor (4), after having passed through the separator (5), is introduced in reactor (6). The polymer is then discharged from reactor (6) to separator (7). The make-up monomers are fed into reactor (4) and (6) at a point above the fluidised bed through lines (10) and (11). If the process requires a single gas phase step the polymer produced is collected at the exit of the separator (5).

Figure 1:
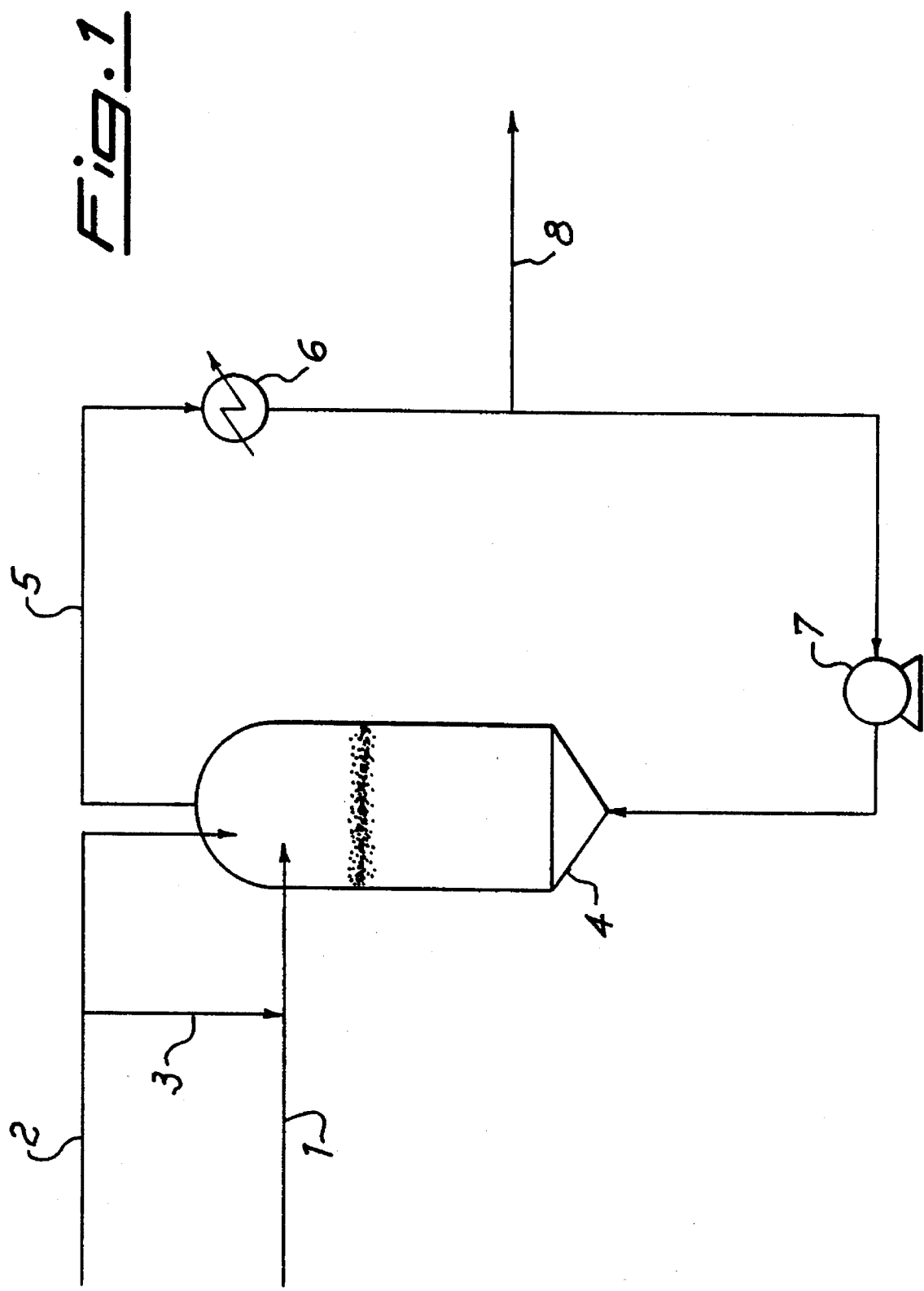

The process of the invention can be used for preparing a large number of different olefin polymers such as, for example, high density polyethylene (HDPE; density higher than 0.940) among which are ethylene homopolymers and copolymers of ethylene with alpha olefins having 3 to 12 carbon atoms; linear low density polyethylene (LLDPE; density lower than 0.940) and very low or ultra low density polyethylene (VLDPE or ULDPE; density less than 0.920 and as low as 0.880) consisting of a copolymer of ethylene and one or more alpha olefins having 3 to 12 carbon atoms and with a content of ethylene units of higher than 80% by mole; elastomeric terpolymers of ethylene, propylene and diene and elastomeric copolymers of ethylene and propylene having a content of ethylene units comprised between 30 and 70% by weight; isotactic polypropylene and crystalline copolymers of propylene and ethylene and/or other alpha olefins, having a content of units deriving from propylene of higher than 85% by weight; impact resistant propylene polymers obtained by sequential polymerization of propylene and a mixture of propylene with ethylene, containing up to 30% by weight of units deriving from ethylene; copolymers of propylene and 1-butene having a content of units deriving from 1-butene between 10 and 40% by weight.

The following examples can further illustrate the present invention. Naturally, variations can be carried out without departing from the scope of the present invention.

The properties indicated have been determined according to the following methods:

MIE Melt flow index: ASTM-D 1238, condition E;

MIF Melt flow index: ASTM-D 1238, condition F;

MIL Melt flow index: ASTM-D 1238, condition L;

Bulk density: DIN-53194;

Xylene soluble fraction: determined at 25° C.;

Comonomer content: percentage by weight of comonomer determined by IR spectra;

Real Density: ASTM-D 792.

EXAMPLE 1

Preparation of the solid catalyst component

Into a stirred reactor 28.4 g of $MgCl_2$, 49.5 g of anhydrous ethanol, 10 ml of vaseline oil ROL OB/30, 100 ml of silicone oil having a viscosity of 350 cs were added. The mixture was heated at 120° C. until $MgCl_2$ was dissolved. The hot reaction mixture was then transferred to a 1.5 l reactor having a Ultra Turrax T-45 N stirrer, containing 150 cm$^3$ of vaseline oil and 150 cm$^3$ of silicone oil. The temperature was maintained at 120° C. whilst stirring for 3 minutes at 2000 RPM. The mixture was then discharged in a 2 liter stirred tank, containing 1 l of anhydrous n-heptane cooled to 0° C., whilst stirring at a speed of 6 m/sec for about 20 minutes, maintaining the temperature at 0° C. The particles so obtained, after washing with n-hexane, were subjected to a thermal treatment in a nitrogen stream, an temperatures ranging from 50° to 150° C., until spherical particles, having a residual alcohol content of about 35% by weight, were obtained. 300 g of this product were charged into a 5000 cm$^3$ reactor in suspension with 300 cm$^3$ of anhydrous hexane. Whilst stirring at room temperature, 130 g of triethyl aluminium (TEAL) in hexane solution was slowly added. The mixture was heated to 60° C. for 60 minutes and then stirring was stopped; the mixture was left to settle and the clear phase was separated. The treatment with TEAL was repeated two more times under the same conditions; the obtained solid was then washed with hexane and dried at 50° C. 260 g of so obtained support was charged into a reactor together with 3 liters of anhydrous hexane; whilst stirring 242 g of $Ti(OBu)_4$ was fed at room temperature. The mixture was stirred for 30 minutes and then 350 g of $SICl_4$, diluted with 250 cm$^3$ of hexane, was fed over 30 minutes and at room temperature. The mixture was heated to 65° C. and maintained under stirring for 3 hours; the liquid phase was then separated by settling and siphoning. Then, 7 washings with hexane were carried out followed by drying the compound obtained at 50° C. under vacuum.

Polymerization

Figure 2:
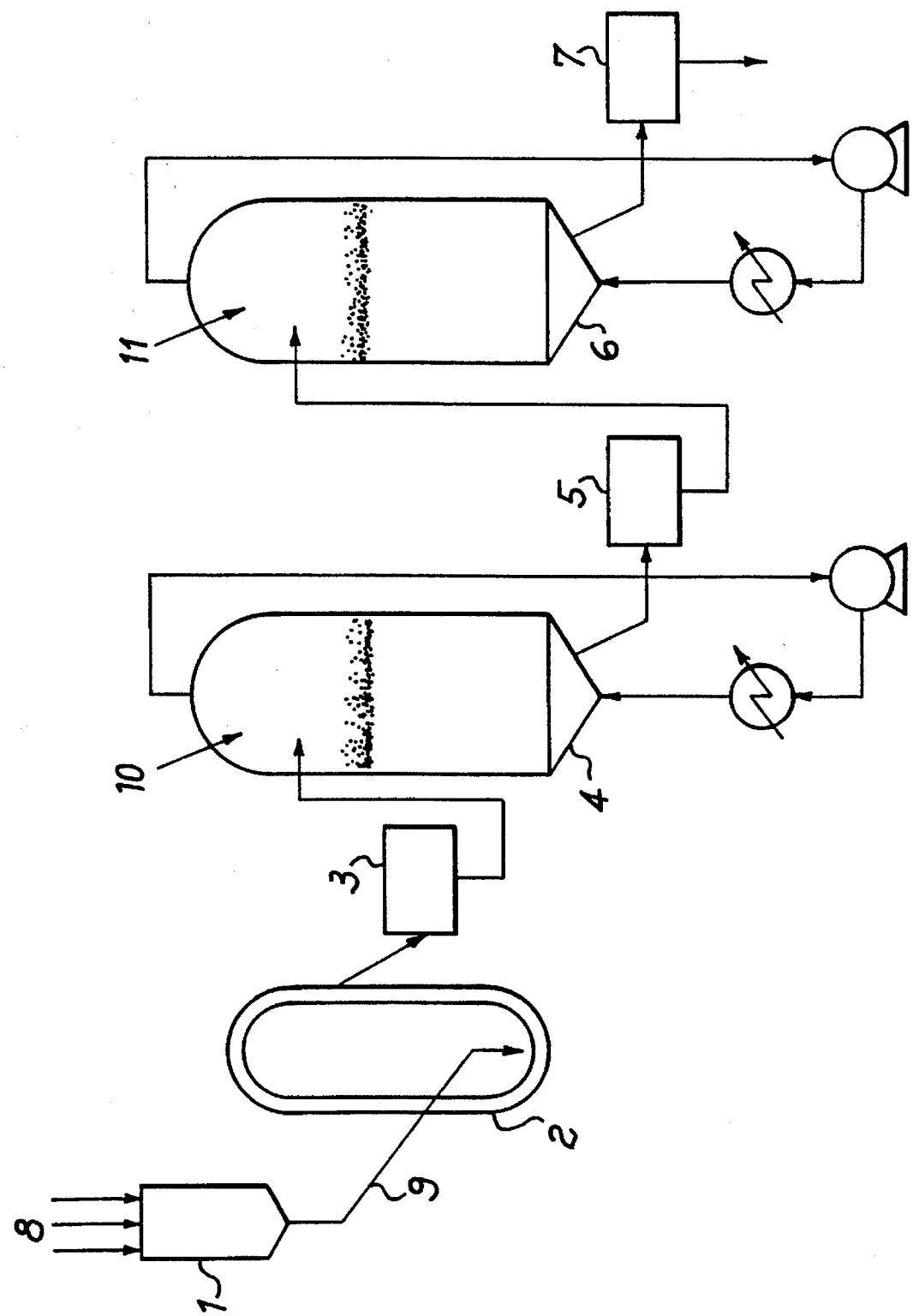

A plant having the set up of FIG. 2 was used to produce LLDPE through copolymerization of ethylene with hexene. The solid component prepared according to the above described process and a solution of TEAL in n-hexane were fed to a precontacting reactor and from this to a slurry prepolymerization reactor wherein ethylene was polimerized. The suspending liquid was liquid propane. The propanic slurry containing the prepolymer was continuously discharged from the prepolymerization reactor to the first gas phase reactor. Hydrogen was also fed to the prepolymerization reactor in order to control the molecular weight of the prepolymer. To the first and second gas phase reactors propane was added for a better control of the reactivity of the system.

| Main operating conditions | | | |
|---|---|---|---|
| Precontact step | | | |
| - Temperature | (°C.) | = | 20 |
| - Residence time | (min) | = | 10 |
| - TEAL/Ti | (mol) | = | 30 |
| Prepolymerization step | | | |
| - Temperature | (°C.) | = | 25 |
| - Residence time | (min) | = | 30 |
| First gas phase reactor | | | |
| - Temperature | (°C.) | = | 85 |
| - Pressure | (barg) | = | 20 |
| - Hydrogen/Ethylene | (mol) | = | 0.14 |
| - Hexene/(hexene + ethylene) | (mol) | = | 0.15 |
| - Propane | (% mol) | = | 80.0 |
| Second gas phase reactor | | | |
| - Temperature | (°C.) | = | 85 |
| - Pressure | (barg) | = | 20 |
| - Hydrogen/Ethylene | (mol) | = | 0.14 |
| - Hexene/(hexene + ethylene) | (mol) | = | 0.15 |
| - Propane | (% mol) | = | 50.0 |
| Characteristics of the end product | | | |
| - Final Yield | (Kg/gr cat) | = | 10.4 |
| - Real Density | (Kg/l) | = | 0.918 |
| - Melt Index "E" | (gr/10 min) | = | 1 |
| - Bulk Density | (Kg/l) | = | 0.380 |

The test lasted about 15 days. At the end, the inspection of the reactors revealed that they were perfectly clean: the walls were not covered in polymer and there was neither formation of chunks nor caking.

EXAMPLE 2

Preparation of the solid catalyst component

Into a stirred reactor 28.4 g of $MgCl_2$, 49.5 g of anhydrous ethanol, 10 ml of vaseline oil ROL OB/30, 100 ml of silicone oil having a viscosity of 350 cs were added. The mixture was heated at 120° C. until $MgCl_2$ was dissolved. The hot reaction mixture was then transferred to a 1.5 l reactor equipped with a Ultra Turrax T-45 N stirrer, containing 150 $cm^3$ of vaseline oil and 150 $cm^3$ of silicone oil. The temperature was maintained at 120° C. whilst stirring for 3 minutes at 3000 RPM. The mixture was then discharged in a 2 liter stirred tank containing 1 l of anhydrous n-heptane cooled to 0° C. whilst stirring at a speed of 6 m/sec for about 20 minutes, maintaining the temperature at 0° C. The particles so obtained, after washing with n-hexane, were subjected to a thermal treatment in a nitrogen stream, at temperatures ranging from 50° to 150° C. until spherical particles were obtained having a residual alcohol content of about 35% by weight. 25 g of this product were charged into a stirred reactor containing 625 ml of $TiCl_4$ at 0° C. and under stirring. The mixture was then heated to 100° C. for one hour and then left to cool. When the temperature of 40° C. was reached, diisobutyl phthalate was added in quantities such to give a molar ratio of magnesium to phthalate of 8. The mixture was heated to 100° C. for 2 hours under stirring and then the solid was left to settle. The hot liquid was removed by syphoning. Then 500 ml of $TiCl_4$ was added and the mixture was heated to 120° C. for 1 hour whilst stirring. After settling, the hot liquid was removed by syphoning and the solid was washed with n-hexane.

Polymerization

A plant having the set up of FIG. 2 was used to produce LLDPE modified through copolymerization of butene/propylene in the first gas phase reactor and copolymerization of ethylene/butene in the second gas phase reactor. The solid component prepared according to the above described process, a solution of TEAL in n-hexane and cyclohexylmethyl-dimethoxy-silane were fed to the precontacting reactor and from this to the prepolymerization reactor in liquid propylene. The propylene slurry containing the prepolymer was continuously discharged from the prepolymerization reactor to the first gas phase reactor. Hydrogen was also fed to the prepolymerization reactor in order to control the molecular weight of the prepolymer. To the first and second gas phase reactors propane was added for a better control of the reactivity of the system.

| Main operating conditions | | | |
|---|---|---|---|
| Precontact step | | | |
| - Temperature | (°C.) | = | 20 |
| - Residence time | (min) | = | 9 |
| - TEAL/Ti | (mol) | = | 120 |
| - TEAL/silane | (mol) | = | 20 |
| Prepolymerization step | | | |
| - Temperature | (°C.) | = | 50 |
| - Residence time | (min) | = | 80 |
| First gas phase reactor | | | |
| - Temperature | (°C.) | = | 60 |
| - Pressure | (barg) | = | 18 |
| - $H_2/C_3H_6$ | (mol) | = | 0.010 |
| - $C_4H_8/(C_4H_8 + C_3H_6)$ | (mol) | = | 0.115 |
| - Propane | (% mol) | = | 80.0 |

| Main operating conditions | | | |
|---|---|---|---|
| Second gas phase reactor | | | |
| - Temperature | (°C.) | = | 90 |
| - Pressure | (barg) | = | 17.5 |
| - $H_2/C_2H_4$ | (mol) | = | 0.27 |
| - $C_4H_8/(C_4H_8 + C_2H_4)$ | (mol) | = | 0.20 |
| - Propane | (% mol) | = | 44 |
| Characteristics of the final product | | | |
| - Real Density | (Kg/l) | = | 0.916 |
| - Bound butene | (% wt) | = | 7 |
| - Melt Index "E" | (gr/10 min) | = | 1.1 |

The test lasted about 20 days. At the end, the inspection of the reactors revealed that they were perfectly clean: the walls were not covered in polymer and there was neither formation of chunks nor caking.

EXAMPLE 3

A heterophasic copolymer of propylene was prepared by sequential polymerization of propylene and a mixture of propylene with ethylene, by using a plant of the type described in FIG. 2 comprising:

a precontact step;

a prepolymerization step;

a gas phase polymerization step carried out using three reactors connected in series.

The solid catalyst components prepared according to the method described in example 2, a TEAL solution in n-hexane and dicyclopennyl-dimethoxy-silane were fed to the precontacting reactor which was maintained at a constant temperature of 30° C. The product discharged from this reactor was fed to the prepolymerization reactor to which also propylene and propane were fed. The residence time in the prepolymerization reactor was about 20 minutes and the temperature was maintained constant at 20° C. The prepolymer was then fed to the first of the three gas phase reactors connected together in series. In the first reactor polypropylene homopolymer was produced, while in the second and third reactors ethylene/propylene copolymer was produced. In all the gas phase reactors the make-up monomers were directly fed into the reactors at a point placed above the fluidised bed.

| Main operating conditions | | | |
|---|---|---|---|
| Precontact step | | | |
| - Temperature | (°C.) | = | 30 |
| - Residence time | (min) | = | 9 |
| - TEAL/Ti | (mol) | = | 80 |
| - TEAL/silane | (mol) | = | 20 |
| Prepolymerization step | | | |
| - Temperature | (°C.) | = | 20 |
| - Residence time | (min) | = | 20 |
| First gas phase reactor | | | |
| - Temperature | (°C.) | = | 75 |
| - Pressure | (barg) | = | 16 |
| - $H_2/C_3H_6$ | (mol) | = | 0.17 |
| - Propane | (% mol) | = | 60.0 |
| Second gas phase reactor | | | |
| - Temperature | (°C.) | = | 60 |
| - Pressure | (barg) | = | 16 |
| - $H_2/C_2H_4$ | (mol) | = | 0.11 |

-continued

| Main operating conditions | | | |
|---|---|---|---|
| - $C_2H_4/(C_2H_4 + C_3H_6)$ | (mol) | = | 0.33 |
| - Propane | (% mol) | = | 50 |
| Third gas phase reactor | | | |
| - Temperature | (°C.) | = | 60 |
| - Pressure | (barg) | = | 16 |
| - $H_2/C_2H_4$ | (mol) | = | 0.10 |
| - $C_2H_4/(C_2H_4 + C_3H_6)$ | (mol) | = | 0.32 |
| - Propane | (% mol) | = | 30 |
| Characteristics of the final product | | | |
| - Final Yield | (Kg/gr cat) | = | 10.4 |
| - Melt Index "L" | (gr/10 min) | = | 2.8 |
| - Bound ethylene | (% weight) | = | 28.6 |
| - Xylene solubility | (% weight) | = | 46 |

The plant ran continuously for 8 days. As an indicative parameter for the arising of reactor fouling, the heat exchange coefficient of the heat exchanger placed in the recycle line was measured: for the whole test this coefficient remained constant (700 Kcal/hr·m²·°K.)

For comparative purposes, the make-up monomers were fed in the recycle line at a point placed upstream of the heat exchanger: after 3 days of running the heat exchange coefficient of the heat exchanger had reduced 25%, indicating a build up of polymer on the surfaces of the heat exchanger.

We claim:

1. A continuous process for the gas phase polymerization of one or more olefins $CH_2=CHR$, where R is hydrogen or a alkyl, cycloalkyl or aryl radical having 1–12 carbon atoms, using a catalyst comprising the product of the reaction among the following components: (A) a titanium or vanadium compound having, respectively, at least one Ti-halogen or V-halogen bond, a magnesium halide and optionally an electron donor; (B) a trialkyl-aluminium compound; (C) optionally, an electron donor compound, said polymerization being carried out in one or more fluidised bed reactors comprising a polymerization zone and a gas speed reduction zone, said fluidised bed reactor being joined to a recycle line, comprising compression and cooling devices, by means of which the exiting gas at the top of the reactor is compressed, cooled and again sent to the reactor at a point below the reaction zone, characterised by the fact that the make-up monomer or monomers are directly sent to said fluidised bed reactor in one or more points above the fluidised bed.

2. A process according to claim 1, characterised by the fact that the polymerization is carried out in the presence of an alkane having 3 to 5 carbon atoms.

3. A process according to claim 2, characterised by the fact that said alkane is propane.

4. A process according to claim 1, characterised by the fact that before being introduced into the gas phase reactor, the catalyst components are subjected to the following treatments:

(a) precontacting the catalyst components in the absence of polymerizable olefins or in the presence of said olefins in amounts smaller than 5 grams per gram of solid catalyst component (A);

(b) prepolymerization of one or more olefins $CH_2=CHR$, in amounts between 10 g per g of solid component (A) and 10% of the final catalyst yield.

5. A process according to claim 1, characterised by the fact that at least one of the make-up monomer or monomers is fed into the gas phase reactor in liquid form.

6. A process according to claim 4 characterised by the fact that the make-up monomer or monomers are fed to the gas phase reactor together with the stream exiting from the prepolymerization reactor.

7. A process according to claim 1 characterised by the fact that the gas phase polymerization is carried out in at least two reactors in series.

* * * * *